(No Model.)
W. J. McKAY.
FRUIT CLEANER.
No. 599,515.　　　　　　　　Patented Feb. 22, 1898.
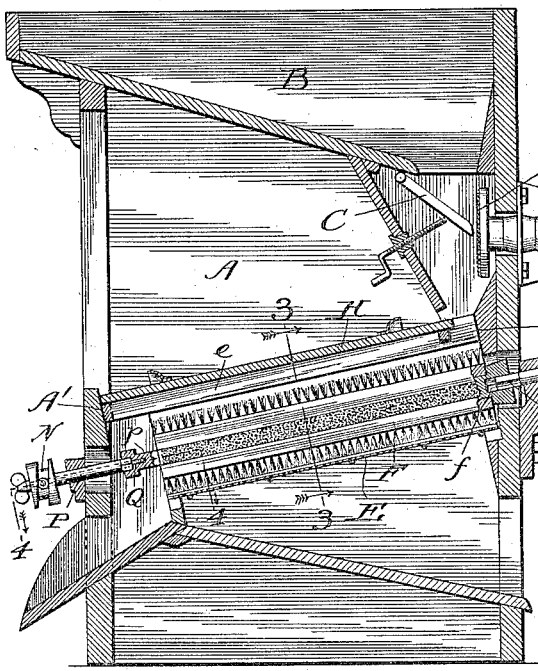
Fig. 1.
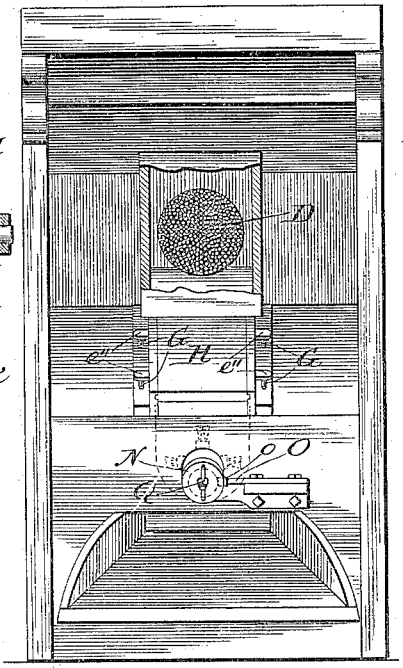
Fig. 2.
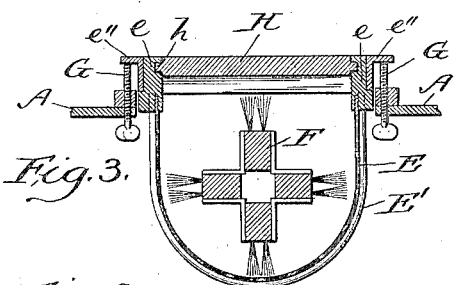
Fig. 3.　　　Fig. 4.
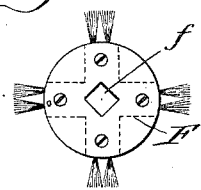
Fig. 6.
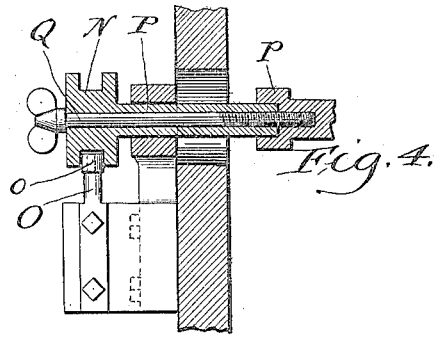
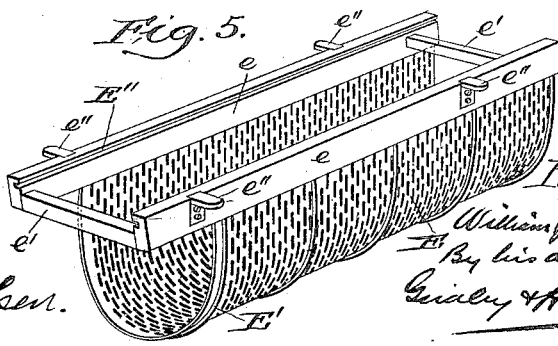
Fig. 5.
Witnesses
W. C. Oakes
Martin H. Olsen
Inventor
William J. McKay
By his attorneys
Gridley & Hopkins

UNITED STATES PATENT OFFICE.

WILLIAM J. McKAY, OF CHICAGO, ILLINOIS.

FRUIT-CLEANER.

SPECIFICATION forming part of Letters Patent No. 599,515, dated February 22, 1898.

Application filed October 26, 1896. Serial No. 610,117. (No model.)

*To all whom it may concern:*

Be it known that I, WILLIAM J. MCKAY, a citizen of the Dominion of Canada, residing at Chicago, in the county of Cook and State of Illinois, have invented certain new and useful Improvements in Fruit-Cleaners, of which the following is a specification, reference being had to the accompanying drawings, which are made a part hereof, and in which—

Figure 1 is a vertical longitudinal section of a fruit-cleaner embodying the invention. Fig. 2 is an end elevation thereof with a portion broken away. Fig. 3 is a transverse section of a portion thereof on a somewhat larger scale, the plane of the section being indicated by the line 3 3, Fig. 1. Fig. 4 is a horizontal section of a portion thereof on a still larger scale, the plane of the section being indicated by the line 4 4, Fig. 1. Fig. 5 is a perspective view of the sieve and its accessories. Fig. 6 is an end elevation of the cleaning-brush.

The subject of the present invention is a machine for cleaning and stemming fruit of different kinds, and its essential parts are a sieve, the character of which depends upon the kind of fruit to be treated, a brush disposed within the sieve, means for rotating it, and means for feeding the fruit into the sieve at the head thereof. Usually, and preferably according to the present invention, the sieve is of substantially U shape in cross-section, and in order to make one and the same machine available for treating fruit of different kinds—such as raisins, currants, &c.—the sieve and brush are relatively adjustable for the purpose of varying or regulating the space between them. In machines of this character as heretofore constructed the sieve occupies a fixed invariable position with relation to the frame of the machine, while the brush is adjustable. According to the present invention, however, the sieve is adjustable, and preferably this is accomplished by providing the frame with adjustable supports for the sieve. Furthermore, in machines of this character as heretofore constructed the brush has only a rotary movement; but according to the present invention it has also an endwise reciprocating movement, which greatly increases its cleaning action and facilitates the feeding of the fruit through the machine.

The invention consists in the features of novelty that are particularly pointed out in the claims hereinafter, and in order that it may be fully understood I will describe it with reference to the drawings.

A represents the frame or casing, which may be of any desired construction; B, a hopper into which the fruit to be cleaned is placed; C, an adjustable valve for regulating the discharge of the fruit from the hopper; D, a revoluble disk for assisting the feeding of the fruit from the hopper; E, the sieve into which the fruit falls, and F the cleaning-brush.

As before stated, the character of the sieve to be used in a given instance will depend upon the character of the fruit to be cleaned, and in practice each machine is provided with a number of sieves of different characters. The invention is not, however, limited to a sieve of any particular construction, and hence for the purposes of this application it is not necessary to show more than one. The sieve is supported by the main frame without being attached thereto, so that it may be removed from its place by simply lifting it from its supports, which latter are of such a character that it may be adjusted up or down, as may be necessary, in order to provide the proper space between it and the brush.

The sieve shown in the drawings comprises a sieve proper made up of a slotted piece of sheet metal bent to U shape and a frame having grooves in which the margins of the sieve proper are secured, the sieve proper being braced by hoops or bands E', which embrace its exterior and have their ends permanently secured in the frame. The frame comprises two longitudinal strips e, connected at their ends by transverse strips e', which are of less width than the strips e. To the strips e are secured laterally-projecting brackets e'', which rest upon the adjustable supports that are carried by the frame. As shown in the drawings, these adjustable supports consist of screws G, that have threaded engagement with the frame or some part carried thereby and so disposed that one of them will be in position to receive each of the brackets e''. By adjusting these screws one way or the other the brush and sieve may be brought to the desired positions with relation to each other. In the inner faces of the side strips e of the frame are cut grooves E'' for receiving tongues h, formed on the opposite edges of a cover H. The frame is also provided with stops A', which engage the sieve-frame for the purpose of restraining it against any endwise movement, while permitting it to be moved up and down for the purpose of the adjustment already described.

The invention is not limited to stops of any particular construction or stops located in any particular place or places for restraining the endwise movement of the sieve, and I therefore desire to have it understood that the term "stop" as herein used is intended to comprehend any device or devices of whatever construction and wherever located for accomplishing this result.

As shown in the drawings, the brush is provided at one end with a non-circular socket $f$, in which fits the non-circular portion $i$ of a shaft I, which is journaled in a bracket J, and has secured to it a pinion K, meshing with a larger pinion L, carried by the main shaft M of the machine. The pinion K is fixedly secured to the shaft I, so as to prevent it from moving endwise thereon, and the endwise movement of the shaft within its bearings is prevented by the engagement of the pinion K with the two arms of the bracket J. With this arrangement rotary movement is transmitted from the main shaft M to the brush, the shaft I is held against endwise movement, and the brush is permitted an endwise movement relatively to said shaft. This endwise movement is produced by a cam N, which is secured to the brush in the manner presently described, and engages a finger O, permanently secured to the frame of the machine and having an antifriction-roller $o$ engaging the cam. The cam is carried by a section P of the shaft of the brush, which section has a squared portion $p$ fitting in a corresponding socket in the end of the brush and is perforated longitudinally for the passage of a bolt Q, which has threaded engagement with the end of the brush. This is a simple and efficient means for imparting reciprocating movement to the brush, and while I shall claim it specifically still I desire to have it understood that in its broadest aspect my invention is not limited thereto, but on the contrary comprehends any means in a machine of this kind by which the brush is given an endwise reciprocating movement in addition to the customary rotary movement.

Having thus described my invention, the following is what I claim as new therein and desire to secure by Letters Patent:

1. In a fruit-cleaner, the combination of a main frame, a rotary brush journaled therein so as to be removable, a sieve having a rigid frame, supports carried by the main frame and engaging the under side of the frame of the sieve whereby the sieve is supported by the main frame without being attached thereto and may be removed from its place by simply lifting it from its supports, and means for adjusting the sieve with relation to the brush, substantially as set forth.

2. In a fruit-cleaner, the combination of a main frame, a rotary brush journaled therein so as to be removable, a sieve having a rigid frame, and supports disposed between the under side of the sieve-frame and the main frame whereby the sieve is supported by the main frame without being attached thereto and may be removed from its place by simply lifting it from its supports, said supports being adjustable whereby the sieve may be adjusted with relation to the brush, substantially as set forth.

3. In a fruit-cleaner, the combination with a rotary brush and a sieve, made up of a sieve proper, longitudinal strips, to which the margins of the sieve proper are secured, and transverse strips rigidly connecting the longitudinal strips, of a main frame in which the brush is journaled so as to be removable and supports, carried by the main frame, upon the tops of which the sieve-frame rests, whereby the sieve is supported by the main frame without being attached thereto and may be removed from its place by simply lifting it from its supports, said supports being adjustable whereby the sieve may be adjusted with relation to the brush, substantially as set forth.

4. In a fruit-cleaner, the combination with a rotary brush, and a sieve having a rigid frame and supporting-brackets carried thereby, of a main frame in which the brush is journaled so as to be removable, and adjustable set-screws, carried by the main frame, upon the upper ends of which the brackets of the sieve rest, whereby the sieve may be removed, or adjusted with relation to the brush, substantially as set forth.

5. In a fruit-cleaner, the combination of a frame, a sieve which is stationary while in operation, a rotary brush, means for imparting to the brush an endwise reciprocating movement, a shaft, means connecting the brush and shaft so as to prevent their relative rotation while permitting the endwise movement of the brush relatively to the shaft, and means for rotating the brush, substantially as set forth.

6. In a fruit-cleaner, the combination with the frame and the sieve, of a brush having a non-circular socket in one of its ends, a shaft having a non-circular portion occupying said socket so as to permit of the relative endwise movement of the shaft and brush, means for revolving the shaft, and means for imparting an endwise, reciprocating movement to the brush, substantially as set forth.

7. In a fruit-cleaner, the combination with the frame, the sieve, the brush and means for revolving it, of a fixed part, a cam engaging it, a shaft-section carrying the cam, and means removably securing said shaft-section to the brush, substantially as set forth.

WILLIAM J. McKAY.

Witnesses:
GORDON C. McNEIL,
C. O. HODGDON.